(12) United States Patent
Givens et al.

(10) Patent No.: US 11,651,396 B2
(45) Date of Patent: May 16, 2023

(54) AUTOMATIC GENERATION OF A FUNDING EVENT

(71) Applicant: International Business Machines Corporation, Armonk, NY (US)

(72) Inventors: Charlet N. Givens, Dallas, TX (US); Cienn R. Givens, Dallas, TX (US); Tsz S. Cheng, Grand Prairie, TX (US); Iris M. Rivera, Earlton, NY (US)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 16/445,985

(22) Filed: Jun. 19, 2019

(65) Prior Publication Data
US 2020/0402117 A1     Dec. 24, 2020

(51) Int. Cl.
*G06Q 30/00* (2023.01)
*G06Q 30/0279* (2023.01)
*G06Q 50/00* (2012.01)
*G06Q 10/1093* (2023.01)

(52) U.S. Cl.
CPC ..... *G06Q 30/0279* (2013.01); *G06Q 10/1093* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 3,493,923 A | 2/1970 | Stevens | |
| 8,228,380 B2 | 7/2012 | Hardee | |
| 11,069,437 B1* | 7/2021 | Artusy | G16H 10/60 |
| 2009/0231429 A1 | 9/2009 | Hardee | |
| 2014/0012771 A1* | 1/2014 | Dunbar | G06Q 30/0279 |
| | | | 705/329 |
| 2014/0164049 A1* | 6/2014 | Yakos | G06Q 10/0633 |
| | | | 705/7.27 |
| 2015/0206108 A1 | 7/2015 | Taylor | |
| 2015/0262263 A1 | 9/2015 | Bellini | |
| 2015/0339639 A1* | 11/2015 | Choe | G06Q 20/10 |
| | | | 705/39 |
| 2016/0005088 A1 | 1/2016 | Parkinson | |
| 2016/0071209 A1* | 3/2016 | Katoli | G06Q 40/04 |
| | | | 705/37 |

(Continued)

OTHER PUBLICATIONS

MacKoul et al. provisional U.S. Appl. No. 62/806,470, filed Feb. 15, 2019 (Year: 2019).*

(Continued)

*Primary Examiner* — Naresh Vig
(74) *Attorney, Agent, or Firm* — Erika R. DeCosty

(57) ABSTRACT

Aspects of the present invention disclose a method, computer program product, and system for automatically creating a funding event in response to identifying an issue. The method includes one or more processors identifying an issue and an individual associated with the issue. The method further includes one or more processors determining whether the individual meets eligibility criteria of a crowdfunding platform. In response to determining that the identified individual does meet eligibility criteria of the crowdfunding platform, the method further includes one or more processors creating a funding event for receiving donations to resolve the identified issue.

20 Claims, 4 Drawing Sheets

(56) References Cited

U.S. PATENT DOCUMENTS

| | | | | |
|---|---|---|---|---|
| 2016/0078408 | A1* | 3/2016 | Vo | G06Q 10/1057 |
| | | | | 705/322 |
| 2017/0345292 | A1 | 8/2017 | Haran | |
| 2018/0082249 | A1 | 3/2018 | High | |
| 2018/0101909 | A1 | 4/2018 | Silman | |
| 2018/0158114 | A1* | 6/2018 | Twist | G06Q 30/0279 |
| 2018/0322542 | A1* | 11/2018 | Stantchev | G06Q 30/0283 |
| 2018/0240344 | A1 | 12/2018 | Matthiesen | |
| 2019/0147505 | A1* | 5/2019 | Blass | G06Q 20/10 |
| | | | | 705/36 R |
| 2020/0184433 | A1* | 6/2020 | Olenoski | G06Q 20/363 |
| 2020/0265482 | A1* | 8/2020 | Mackoul | G06Q 40/02 |
| 2020/0364804 | A1* | 11/2020 | Bechtold | G06Q 30/0279 |
| 2021/0374812 | A1* | 12/2021 | Hoang | G06N 20/00 |

OTHER PUBLICATIONS

Information on GoFundMe.com, 2019, archived web pages printed through www.archive.org, date is in the URL in YYYYMMDD format (Year: 2019).*

Recurring donors 440 percent more valuable than one-off donors, May 3, 2018, PhilanthrophyNewsDigest.org (Year: 2018).*

"Improving traffic safety with a crowdsourced traffic violation reporting app", by The Korea Advanced Institute of Science and Technology (KAIST), Apr. 11, 2017, Phys Org, 3 pps., <https://phys.org/news/2017-04-traffic-safety-crowdsourced-violation-app.html>.

"Infiniti EX "Around View Monitor" Birdseye Camera", by pikesan99, Published on Oct. 21, 2007, 2 pps., <https://www.youtube.com/watch?v=VBGJjNr6vAE>.

"Relief from the high cost of traffic tickets—for some Californians at least", By The Times Editorial Board, 5 pps., The Los Angeles Times, Aug. 11, 2017, <https://android.gadgethacks.com/how-to/diagnose-your-cars-check-engine-light-using-android-phone0177132/>.

Ethan, "Take your first trip with Dash", dash, 4 pps., Apr. 26, 2019, <https://dashlabs.zendesk.com/hc/en-US/articles/200756904-Getting-Started-Connect-Dash-to-yourOBD-adapter>.

Hudson, "California Has a System That Punishes the Poor Through Traffic Violations—Civil Rights Groups Are Starting to Change That", 6 pps., Aug. 28, 2017, AlterNet, <https://www.alternet.org/human-rights/aclu-lccr-california-end-unreasonable-traffic-fines-solano-county>.

Mock, "Locking Up the Poor One Fine at a Time", Oct. 6, 2017, 2 pps., Pacific Standard, <https://psmag.com/social-justice/municipal-courts-fining-the-poor>.

Epson, "Diagnose Your Car's Check Engine Light Using an Android Phone", Apr. 19, 2017, GadgetHacks.com, 7 pps.

* cited by examiner

AUTOMATIC GENERATION OF A FUNDING EVENT

BACKGROUND OF THE INVENTION

The present invention relates generally to the field of data analytics, and more particularly to generating a funding event.

Crowdsourcing is a sourcing model in which individuals or organizations obtain goods and services, including ideas and finances, from a large, relatively open and often rapidly-evolving group of users (e.g., via the Internet). Crowdsourcing can divide work between participants to achieve a cumulative result. Crowdfunding is a form of crowdsourcing that facilitates the funding of a project, venture, benefit event, etc. Crowdfunding allows the raising of small amounts of money from large amounts of people, typically via the Internet. The modern crowdfunding model is generally based on three types of actors: the project initiator who proposes the idea or project to be funded, individuals or groups who support the idea, and a moderating organization (the "platform") that brings the parties together to launch the idea.

Image analysis includes the utilization of digital image processing techniques to extract meaningful information from images, such as digital images. In recent years, there has been an increase in demand to utilize the advanced techniques for analyzing large and/or complex data sets. In particular, natural language processing (NLP), which is a sub-field of computer science that enables a computer to process and analyze large amounts of natural language data. Cognitive analytics combines the use of cognitive computing and analytics. Cognitive computing combines artificial intelligence and machine-learning algorithms, in an approach that attempts to reproduce the behavior of the human brain. Analytics is the scientific process of transforming data into insights for making better decisions. Cognitive analytics applies intelligent technologies to bring unstructured data sources within reach of analytics processes for decision making.

SUMMARY

Aspects of the present invention disclose a method, computer program product, and system for automatically creating a funding event in response to identifying an issue. The method includes one or more processors identifying an issue and an individual associated with the issue. The method further includes one or more processors determining whether the individual meets eligibility criteria of a crowdfunding platform. In response to determining that the identified individual does meet eligibility criteria of the crowdfunding platform, the method further includes one or more processors creating a funding event for receiving donations to resolve the identified issue.

DETAILED DESCRIPTION

Figure 1:
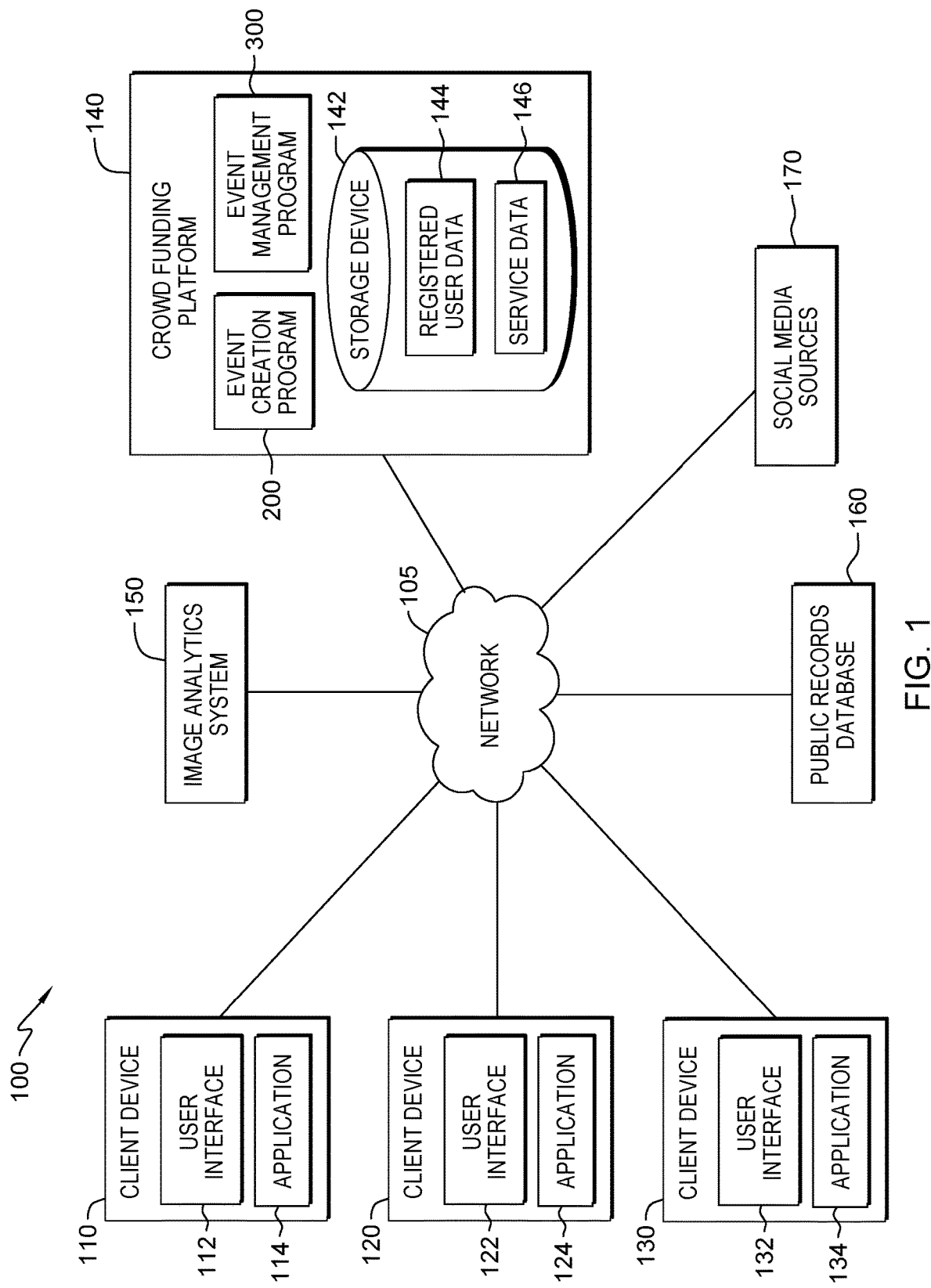
FIG. 1 is a functional block diagram of a data processing environment, in accordance with an embodiment of the present invention.

Embodiments of the present invention allow for automatically creating a funding event in response to identifying an issue. Various embodiments of the present invention monitor a plurality of data sources (e.g., received images and information, social media, and other data sources) looking for issues that a crowdfunding platform can assist with (e.g., utilizing platform-specific rules). In various embodiments of the present invention, an issue is a problem or event that can be remedied or improved with monetary assistance from a crowdfunding campaign. For example, an issue can include home/household repair, meal assistance, bills, disaster relief, car repair, other repairs/maintenance, and other charitable assistance.

Once an issue is identified, embodiments of the present invention determine a monetary value associated with resolving the issue, and an individual associated with the issue. If the individual meets eligibility criteria of the crowdfunding platform (based on rules and criteria specifications of the crowdfunding platform and gathered user information), then a crowdfunding event is created (and published) on the crowdfunding platform. The crowdfunding event is created to solicit donations for a goal amount based on the determined monetary value associated with resolving the issue.

Further, upon creation of the crowdfunding event, notifications are generated and sent out to registered users (e.g., registered users of the crowdfunding platform, users that are registered to receive notifications based on a particular characteristic, such as an identified individual, a location, a particular issue, etc.). Additional embodiments of the present invention collect donations to the crowdfunding event. In response to determining that donations to the funding event meet the goal amount, various embodiments of the present invention facilitate resolution of the issue (e.g., provide funds to the individual, schedule a service to resolve the issue, etc.) and confirm resolution of the issue (e.g., confirm that a service is completed successfully).

Some embodiments of the present invention recognize that crowdfunding platforms provide the ability to provide assistance to individuals, or groups of individuals, by gathering crowdsourced donations (i.e., crowdfunding) from a plurality of donors. Crowdfunding can be utilized to assist in the resolution of a wide variety of issues, such as car repair, home repair, medical bills, infrastructure repair, unexpected expenses, and other forms of monetary assistance. Embodiments of the present invention recognize that an automated system to discover an issue, and then subsequently resolve the issue via an automatically created funding event, is not currently available.

Various embodiments of the present invention provide the advantage of leveraging machine learning and cognitive tools to enable a crowdfunding platform to automatically create a funding event in response to identifying an issue and provide a secure and verified channel to facilitate resolution of the issue. Embodiments of the present invention can identify an issue, determine eligibility of an individual associated with the issue, and initiate a funding effort. The speed facilitated by the embodiments of the present invention can allow an individual in need to receive immediate assistance, which can prevent further issue that may arise from a delay in the process. Additionally, embodiments of the present invention provide technical advantages through an automated system that leverages image analytics and Natural Language Processing (NLP) to provide a cognitive system for creating and deploying a funding event in a crowdfunding platform.

Implementation of embodiments of the invention may take a variety of forms, and exemplary implementation details are discussed subsequently with reference to the Figures.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

An embodiment of data processing environment 100 includes client device 110, client device 120, client device 130, crowdfunding platform 140, image analytics system 150, public records database 160, and social media sources 170, all interconnected over network 105. In an example embodiment, client device 110, client device 120, and client device 130 are users of crowdfunding platform 140. In further embodiments, crowdfunding platform 140 utilizes data from image analytics system 150, public records database 160, and social media sources 170.

Network 105 can be, for example, a local area network (LAN), a telecommunications network, a wide area network (WAN), such as the Internet, or any combination of the three, and include wired, wireless, or fiber optic connections. In general, network 105 can be any combination of connections and protocols that will support communications between client device 110, client device 120, client device 130, crowdfunding platform 140, image analytics system 150, public records database 160, and social media sources 170, in accordance with embodiments of the present invention.

In various embodiments of the present invention, client device 110, client device 120, and client device 130 may be a workstation, personal computer, personal digital assistant, mobile phone, or any other device capable of executing computer readable program instructions, in accordance with embodiments of the present invention. In general, client device 110, client device 120, and client device 130 are representative of any electronic device or combination of electronic devices capable of executing computer readable program instructions. In additional embodiments, data processing environment 100 can include additional, or other, instances of client devices (not shown). Client device 110, client device 120, and client device 130 may include components as depicted and described in further detail with respect to FIG. 4, in accordance with embodiments of the present invention.

Client device 110 includes user interface 112 and application 114. User interface 112 is a program that provides an interface between a user of client device 110 and a plurality of applications that reside on the client device (e.g., application 114). A user interface, such as user interface 112, refers to the information (such as graphic, text, and sound) that a program presents to a user, and the control sequences the user employs to control the program. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API).

Application 114 can be representative of one or more applications (e.g., an application suite) that operate on client device 110. In an example embodiment, application 114 is a client-side application of a product offered by crowdsourcing platform 140 (e.g., a crowdfunding app). In another example embodiment, application 114 is a web browser that an individual utilizing client device 110 utilizes (e.g., via user interface 112) to access crowdfunding platform 140. In other aspects of the present invention, application 114 can be representative of applications that provide additional functionality (e.g., camera, messaging, etc.), in accordance with various aspects of the present invention.

In additional aspects of the present invention, client device 120 includes user interface 122 and application 124, and client device 130 includes user interface 132 and application 134. The respective instances of user interface 122, application 124, user interface 132, and application 134 include functionality as described above, with regard to respective instances of user interface 112 and application 114.

In an example scenario, client device 110 is associated with an individual that identifies an issue, and submits the issue (e.g., as an image, request, etc.) to crowdfunding platform 140 (e.g., a submitting user). In this example scenario, client device 120 is associated with an individual that is associated with the issue that client device 110 identifies (e.g., a recipient user). Further, in this example scenario, client device 130 is associated with an individual that is registered with crowdfunding platform 140 to provide donations to funding events (e.g., a donor user). In other example scenarios, the respective client devices can be associated with users that represent multiple user types within data processing environment 100 (e.g., a user may be both a submitting user and a donor user, etc.). In an alternate example, client device 110 can be representative of a computing device that gathers information corresponding to an asset (e.g., one or more sensor devices on a vehicle, such as an autonomous vehicle or a manned vehicle) and can provide the information to crowdfunding platform automatically (e.g., via application 114).

In additional embodiments, the individuals that are associated with client device 110, client device 120, and client device 130 are registered with crowdfunding platform 140, and have authorized the collection of information (i.e., users that have opted-in), in accordance with embodiments of the present invention. In one scenario, an individual utilizing client device 120 completes a registration process for crowdfunding platform 140 and authorizes the collection and analysis of data associated with the individual (e.g., social media data, eligibility data, contact information, etc.). In another scenario, during the registration process, an individual utilizing client device 130 provides contact information for the user but does not authorize collection of data through social media (e.g., opts-out).

Crowdfunding platform 140 includes event creation program 200, event management program, and storage device 142, which includes registered user data 144 and service data 146. In one embodiment, crowdfunding platform 140 is representative of a service (e.g., hosted by a server computing system) that facilitates funding events to raise money from a plurality of donors, via the Internet. In example embodiments, crowdfunding platform 140 can be a desktop computer, a computer server, or any other computer systems, known in the art. In certain embodiments, crowdfunding platform 140 represents computer systems utilizing clustered computers and components (e.g., database server computers, application server computers, etc.) that act as a single pool of seamless resources when accessed by elements of data processing environment 100 (e.g., client device 110, client device 120, and client device 130). In general, crowdfunding platform 140 is representative of any electronic device or combination of electronic devices capable of executing computer readable program instructions. Crowdfunding platform 140 may include components as depicted and described in further detail with respect to FIG. 4, in accordance with embodiments of the present invention.

Event creation program 200 can automatically create a funding event in response to identifying an issue, in accordance with various embodiment of the present invention. In an example embodiment, event creation program 200 identifies an issue, a monetary value associated with resolving the identified issue, and an individual associated with the identified issue. If the individual meets eligibility criteria of crowdfunding platform 140, then event creation program 200 creates a corresponding funding event on crowdfunding platform 140. Upon creation of the funding event, event creation program 200 sends notifications to users of crowdfunding platform 140.

Event management program 300 is a program for managing a funding event, in accordance with an embodiment of the present invention. Event management program 300 collects donations to a funding event (e.g., a funding event created by event creation program 200). In response to determining that donations to the funding event meet the goal amount, event management program 300 facilitates a resolution of the issue (e.g., provide funds to the individual, schedule a service to resolve the issue, etc.) and confirms resolution of the issue (e.g., confirm that a service is completed successfully).

Storage device 142 can be implemented with any type of storage device, for example, persistent storage 405, which is capable of storing data that may be accessed and utilized by crowdfunding platform 140, such as a database server, a hard disk drive, or a flash memory. In other embodiments, storage device 142 can represent multiple storage devices within crowdfunding platform 140. Storage device 142 includes information that crowdfunding platform 140 utilizes in accordance with embodiments of the present invention, such as registered user data 144, service data 146, and other information (not shown).

In various embodiments, registered user data 144 includes information associated with users of crowdfunding platform 140 and user preference information, provided by users of crowdfunding platform 140 (e.g., in accordance with a registration process). In example embodiments, users authorize crowdfunding platform 140 to collect and store information associated with the users, which have authorized the collection of information (i.e., users that have opted-in), in storage device 142. In one scenario, an individual utilizing client device 120 registers with crowdfunding platform 140 and authorizes crowdfunding platform 140 to collect and store the provided registration information (e.g., contact information, eligibility information, payment information, etc.) and certain information relevant to the user (e.g., social media data, location information, etc.) of the individual utilizing client device 120. In another scenario, an individual utilizing client device 110 crowdfunding platform 140 to collect and analyze information provided by client device 110 (e.g., sensors from a vehicle providing diagnostic information, an autonomous vehicle, etc.).

In another embodiment, users can opt-in to utilize crowdfunding platform 140. For example, a user visits a website associated with crowdfunding platform 140 and the user accepts the terms and conditions of crowdfunding platform 140 as a part of the registration process. In an alternative embodiment, during the registration process, an individual utilizing client device 130 provides contact information for the user but does not authorize collection of data through social media (e.g., opts-out) by crowdfunding platform 140.

In an example embodiment, an individual (e.g., an individual utilizing client device 110) registers with crowdfunding platform 140 and creates a group for members of a community (e.g., a neighborhood). The individual can utilize crowdfunding platform 140 to invite the members of the community to join and register with crowdfunding platform 140. In addition, the individual can also provide images and indications of image sources, as input to crowdfunding platform 140 for data sources to analyze for potential issues in the community. As users register with crowdfunding platform 140, additional sources are made available to crowdfunding platform 140 (e.g., social media data, additional devices, etc.). For example, the registered users provide preference information, which is stored in registered user data 144. In addition, the registered users can provide image and/or video data, which event creation program 200 can analyze. In addition, individuals (e.g., an individual utilizing client device 120) can register with crowdfunding platform 140 and provide verified eligibility information and information associated with an asset that may have an issue (e.g., a car in need of repair), which crowdfunding platform 140 can securely store in registered user data 144.

In another example embodiment, an individual (e.g., an individual utilizing client device 130) registers as a donor with crowdfunding platform 140. The individual can provide payment information/preferences and contact information/preferences, which crowdfunding platform 140 can securely store in registered user data 144. For example, a donor user defines a preference to receive communications associated with funding events for a particular community (e.g., a neighborhood within a proximity to the donor user). In another example, the donor user defines a payment preference that the donor user automatically authorizes a fifty-dollar donation for funding events that include a specified criteria (e.g., an environmental issue within the community of the donor user, etc.). In various examples, an individual can define a preference to donate anonymously.

In other embodiments, registered user data 144 can include an indication of an administrator user, that defines data sources (e.g., instances within public records database 160 and social media sources 170) and can have approval authority for funding events that event creation program 200 creates for a community.

In further embodiments, service data 146 includes information associated with services that can resolve issues presented in a funding event. In an example embodiment, service data 146 includes information associated with a window repair company that can provide window repair services in accordance with requirements of a funding event. In various scenarios, service providers register with crowdfunding platform 140, providing information (e.g., contact information, pricing estimation information, availability schedules, etc.) that crowdfunding platform 140 stores in services data 146.

Service data 146 can securely store information associated with a variety of service providers, which can provide assistance in accordance with terms and conditions of crowdfunding platform 140 (e.g., repair services, insurance information, meal services, volunteer services, etc.). In an example, event creation program 200 can access service data 146 to determine a monetary value associated with resolving an issue and event management program 300 can access service data 146 to contact a service provider and schedule a service to resolve an issue funded through a funding event.

Image analytics system 150 is representative of a computing system that provides analytics services for images and video (e.g., image analysis, object recognition, image comparison, etc.), in accordance with various embodiments of the present invention. In one embodiment, image analytics system 150 can employ object recognition to an image or video to identify objects that have an issue (e.g., a window that has been damaged, a broken taillight of a vehicle, etc.). In an example embodiment, image analytics system 150 can be a service associated with crowdfunding platform 140 or a service that crowdfunding platform 140 can access and utilize. In another embodiment, crowdfunding platform 140 utilizes image analytics system 150 to analyze incoming data feeds (e.g., into event creation program 200) to identify objects and corresponding issues. The incoming data feeds can include, but are not limited to, images provided by users, incoming video feeds, monitored social media pages (e.g., registered community forums), etc.

In one scenario, an individual utilizing client device 110 sends an image to crowdfunding platform 140 (e.g., via application 114) and crowdfunding platform 140 analyzes the image utilizing the capabilities of image analytics system 150. In this scenario, image analytics system 150 determines that a tree branch has fallen and broken a window of a home in the image (e.g., by identifying the broken window, comparing the image of the home to a previous image of the home and identifying a change, etc.).

Public records database 160 is representative of one or more sources of publicly available information and information that registered users of crowdfunding platform 140 have given authorized access. In various embodiments, crowdfunding platform 140 (utilizing event creation program 200) accesses public records database 160 to identify available information associated with an individual (i.e., an individual that is associated with an identified issue) to use in determining whether the individual meets eligibility criteria (e.g., whether the individual qualifies for a funding event).

Social media sources 170 is representative of one or more social media platforms, which registered users have given crowdfunding platform 140 authorization to derive information. In another embodiment, social media sources 170 can include databases that include social media information provided by registered users of crowdfunding platform 140. In an example, an individual utilizing client device 120 registers with crowdfunding platform 140 and provides registration information that includes a username of a social media account of the user, which crowdfunding platform 140 stores in registered user data 144. In this example, in response to identifying an issue associated with the individual, crowdfunding platform 140 (via event creation program 200) can identify information relevant to the username of the social media account.

In another example, an administrator user registers with crowdfunding platform 140 and provides a link to a community message board, which crowdfunding platform 140 stores in registered user data 144. In this example, the community message board is hosted on a platform of social media sources 170.

Figure 2:
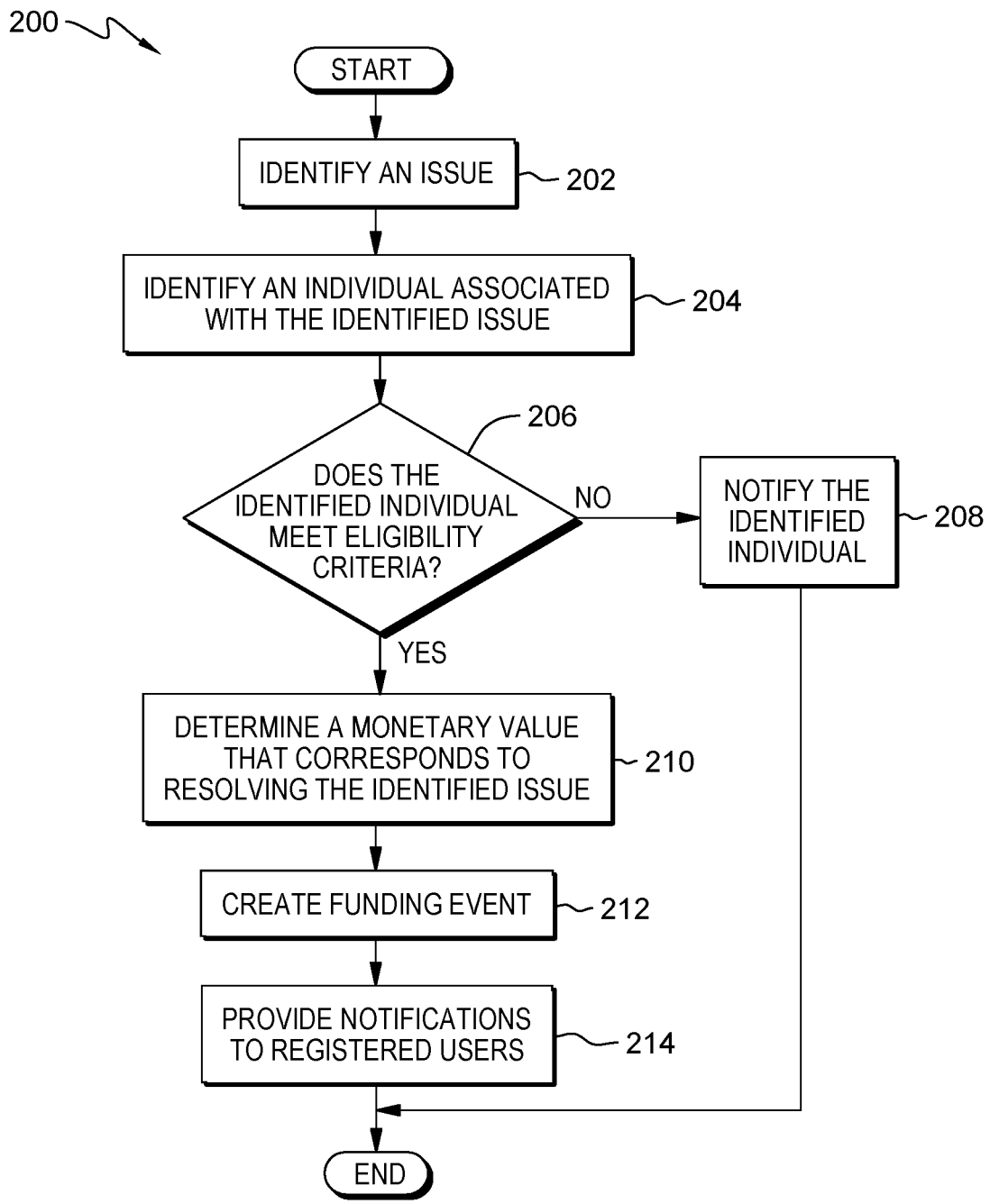
FIG. 2 is a flowchart depicting operational steps of a program for automatically creating a funding event in response to identifying an issue, in accordance with an embodiment of the present invention.

FIG. 2 is a flowchart depicting operation steps of event creation program 200, a program for creating a funding event for an identified issue, in accordance with embodiments of the present invention. In one embodiment, crowdfunding platform 140 utilizes event creation program 200 to scan incoming data streams to identify candidates of issues being sent to crowdfunding platform 140. In various embodiments, event creation program 200 initiates upon identification of an issue (e.g., via a notification from image analytics system 150). In an example embodiment, event creation program 200 initiates in response to crowdfunding platform 140 receiving data (e.g., an image, event request, social media notification, etc.) that includes a potential issue.

In step 202, event creation program 200 identifies an issue. In one embodiment, event creation program 200 identifies an issue in data that crowdfunding platform 140 identifies (e.g., in social media sourced 170, received requests, video feeds, etc.). In various embodiments of the present invention, an issue is a problem or event that can be remedied or improved with monetary assistance from a crowdfunding campaign. For example, an issue can include home/household repair, meal assistance, bills, disaster relief, car repair, other repairs/maintenance, and other charitable assistance. In example embodiments, the parameters of issues are defined by rules of crowdfunding platform 140. For example, crowdfunding platform 140 includes rules (e.g., stored in storage device 142), which define problems and events that qualify as an issue for event creation program 200.

In another embodiment, an administrator user (e.g., an individual utilizing client device 110) provides input that identifies an issue to event creation program 200. Further, crowdfunding platform 140 can specify a particular user (i.e., an administrator user) for event creation program 200 to utilize as a data source for issues without subsequent analysis to confirm issues (e.g., a priority rule).

In an example scenario, crowdfunding platform 140 receives a request for a funding event from an individual utilizing client device 110. In this scenario, the individual submits the request and indicates an issue of a tree branch having fallen and broken the window of a home in the individual's neighborhood (also providing additional identifying information). Event creation program 200 can also access public records database to verify whether a weather event has occurred that is associated with the broken window. Event creation program 200 parses the request and determines that the request does include an issue that satisfies the parameters of the rules of crowdfunding platform 140. Accordingly, event creation program 200 identifies an issue of the window broken by the tree branch in the neighborhood of the individual. In another aspect of this scenario, an administrator user can validate that the request includes an issue. In addition, event creation program 200 can determine that a received request is sent by an administrator user and accordingly, event creation program 200 determines that the received request includes an issue.

In another example scenario, crowdfunding platform 140 receives a submission of an image, from an individual utilizing client device 110, of a vehicle that has a broken tail light. In this scenario, event creation program 200 utilizes image analytics system 150 to analyze (e.g., perform object recognition, image comparisons, etc.) the received image. Event creation program 200 can utilize information from image analytics system 150 to determine whether an issue in the received image satisfies the parameters of the rules of crowdfunding platform 140. In response to determining that the image does include a qualifying issue, event creation program 200 identifies the issue depicted in the image (i.e., the broken tail light of the vehicle). In another aspect of the scenario, event creation program 200 monitors a plurality of data sources (e.g., registered video feeds, image repositories, etc.) utilizing image analytics system 150 to identify an issue.

In yet another example scenario, crowdfunding platform 140 monitors social media sources 170, such as social media accounts, community pages, data feeds, etc., which are associated with information in registered user data 144. In this scenario, event creation program 200 identifies a posting in social media sources 170 that includes a potential issue. For example, event creation program 200 finds a post on a registered community message board that includes text indicating that some community members would benefit from monetary assistance. Event creation program 200 can analyze the content of the posting (e.g., in relation to rules of crowdfunding platform 140) and identify an issue within the social media posting. In another aspect of this scenario, event creation program 200 can receive and identify a request for a funding event submitted by a registered user through social media sources 170.

In an additional example scenario, crowdfunding platform 140 receives real-time information from a vehicle diagnostic system, corresponding to a user that has registered and provided authorization in registered user data 144. Event creation program 200 can monitor the data feed from the vehicle diagnostic system (e.g., an on-board vehicle diagnostic system, sensors affixed to the vehicle, information from an autonomous vehicle, etc.). In this scenario, crowdfunding platform 140 receives data from the vehicle diagnostic system that indicates that the vehicle has a broken tail light. Accordingly, event creation program 200 identifies an issue of a broken tail light on the vehicle. In alternate aspects of the invention, event creation program 200 and crowdfunding platform 140 can receive and monitor data from any form sensors that are registered, in accordance with various embodiments of the present invention.

In step 204, identifies an individual associated with the identified issue. In one embodiment, event creation program 200 identifies a registered user of crowdfunding platform 140, utilizing registered user data 144, that is associated with the identified issue (from step 202). In an example embodiment, event creation program 200 parses a received request for a funding event to identify an individual associated with the identified issue (e.g., an individual indicated in the request). In another example embodiment, event creation program 200 parses a social media posting associated with the identified issue to identify the individual (e.g., utilizing a social media username registered user data 144).

In another embodiment, event creation program 200 requests input to identify an individual associated with the identified issue. For example, event creation program 200 sends a message, to the user (e.g., an individual utilizing client device 110) that submitted a request for a funding event, requesting that the user identify an individual associated with the identified issue. In other embodiments, event creation program 200 identifies multiple individuals that are associated with the identified issue. Event creation program 200 can also identify individuals that are not currently registered with crowdfunding platform 140 and optionally provide a notification to the individual (discussed in further detail with regard to step 208). For example, event creation program 200 parses a request for a funding event that includes an indication of an individual, but the individual is not registered with crowdfunding platform 140 (i.e., in reference to registered user data 144).

In decision step 206, event creation program 200 determines whether the identified individual meets eligibility criteria. In one embodiment, event creation program 200 determines whether the identified individual (from step 204) that is associated with the identified issue (from step 202) meets finding event eligibility criteria of crowdfunding platform 140. In various embodiments, crowdfunding platform 140 can include rules and criteria (e.g., stored in storage device 142) that are based on information including, but not limited to, user-provided income information, whether an individual is registered with crowdfunding platform 140, location information, historical usage information of crowdfunding platform 140 by an individual, asset ownership information (e.g., whether an individual is a registered owner of a home or car), issue resolution types and amounts (e.g., cost and type of repair), and other verifiable criteria (e.g., via public records database 160).

In another embodiment, event creation program 200 determines information associated with the identified user based on information in registered user data 144 and parsed information from a corresponding request for a funding event, to determine whether the identified individual meets eligibility criteria. In another aspect of the present invention, event creation program 200 verifies and validates information, such as included in a request for funding or within registered user data 144, utilizing public records database 160 or via communication with another individual (e.g., an administrator user).

In an example embodiment, event creation program 200 determines eligibility by generating an eligibility score corresponding to the identified individual. In one example, the eligibility score is based on whether the individual meets a defined number of eligibility rules (e.g., an individual meets four out of five criteria) that exceeds a predetermined threshold. In another embodiment, registered user data includes an existing eligibility score (i.e., a previously computed score) associated with the individual that event creation program 200 can utilize to determine whether the individual meets eligibility criteria.

In an example scenario, event creation program 200 identified an issue of a broken window (in step 202) and the individual associated with the issue (in step 204). In this scenario, the individual has provided information to crowdfunding platform 140, which is stored in registered user data 144. Event creation program 200 compares the provided information to eligibility criteria and rules of crowdfunding platform to determine that the individual: has income information that falls within a threshold criteria, is located within a registered community, and is registered as a resident of the home with the broken window. Event creation program 200 can then determine that the individual meets all three criteria, therefore the individual has a one-hundred percent eligibility score, which is above a threshold score of fifty percent. Further, event creation program 200 can verify eligibility information by cross-checking available information with public records database 160. In another scenario, event creation program 200 determines that the identified user is not registered with crowdfunding platform 140, and therefore does not meet eligibility rules and criteria.

In step 208, event creation program 200 notifies the identified individual. More specifically, in response to determining that the identified individual (of step 204) does not meet eligibility criteria (decision step 206, NO branch), event creation program 200 provides a notification to the identified individual. In another aspect of the invention, in response to determining that the identified individual (of step 204) does not meet eligibility criteria, event creation program 200 terminates without providing the notification (i.e., the notification is optional). In another embodiment, subsequent to notifying the identified individual, event creation program 200 terminates.

In an example embodiment, event creation program 200 determines that the individual is not registered with crowdfunding platform 140 (based on registered user data 145). In this example embodiment, event creation program 200 generates and sends a notification that includes a link to register with crowdfunding platform 140 to the identified individual. In addition, event creation program 200 generates and sends a notification that includes information associated with the identified issue (of step 202) to the individual (e.g., an indication of a broken tail light, etc.).

In step 210, event creation program 200 determines a monetary value that corresponds to resolving the identified issue. More specifically, in response to determining that the identified individual (of step 204) meets eligibility criteria (decision step 206, YES branch), event creation program 200 determines a monetary value that corresponds to resolving the identified issue (of step 202).

In one embodiment, event creation program 200 utilizes service data 146 and information associated with the identified issue (from step 202) to determine a monetary value that corresponds to resolving the issue. Service data 146 includes information associated with services that can resolve issues information (e.g., contact information, pricing estimation information, availability schedules, etc.). Event creation program 200 can communicate with one or more service providers (in service data 146) to determine a monetary value and/or identify a predicted cost (e.g., based on a historical average cost to resolve similar issues). For example, event creation program 200 solicits repair cost estimates from a plurality of roof repair services (e.g., from service providers of service data 146) and estimates a repair cost as the monetary value to resolve the identified issue. In another example, event creation program 200 identifies pricing estimation information from publicly available sources, such as public websites.

In an additional embodiment, event creation program 200 further analyzes information associated with the identified issue, received by crowdfunding platform 140 (e.g., an image utilized to identify the issue, content of a request for funding, etc.) and information associated with the individual associated with the identified issue (from step 204). In another embodiment, event creation program 200 can facilitate an interaction with the individual associated with the issue and potential service providers (e.g., exchange contact information, establish a communication channel, etc.), to facilitate interactive user input in determining the monetary value. Event creation program 200 can also access relevant information associated with the identified individual (e.g., in registered user data 144) and/or communicate with the identified individual to solicit information (e.g., insurance information, etc.). Event creation program 200 can leverage any combination of the aforementioned factors to determine the monetary value associated with resolving the issue.

In an example scenario, event creation program 200 identifies an issue of a broken window after a storm (in step 202) from an image submitted to crowdfunding platform 140. In this scenario, event creation program 200 can further utilize image analytics system 150 to identify additional information about the issue (e.g., window dimensions, amount of damage, location, etc.) that factors in to a cost to repair the window. In another aspect of the scenario, event creation program 200 can solicit information from an individual associated with the identified issue (e.g., the individual identified in step 204) that is relevant to determining a monetary value (e.g., insurance information). Event creation program 200 can communicate with one or more repair service providers (e.g., from service data 146) to validate the condition, and other information, associated with the window repair, to determine the monetary value that corresponds to repairing the window.

In another example scenario, event creation program 200 identifies an issue (in step 202) of one or more individuals (identified in step 204) that would benefit from monetary assistance for food purchasing. In this scenario, event creation program 200 determines a cost to provide a meal assistance service to the one or more individuals, based on information in service data 146. In an additional aspect of this scenario, event creation program 200 identifies a severe weather alert and determines an increased priority level for the identified issue (e.g., expedited service). Accordingly, event creation program 200 determines the monetary value to resolve the identified issue based on the cost of the meal assistance service. In various embodiments of the present invention, event creation can leverage one or a combination of the aforementioned scenarios (while also leveraging additional sources) to determine a monetary value that corresponds to resolving an identified issue.

In step 212, event creation program 200 creates a funding event. In one embodiment, event creation program 200 creates a funding event, on crowdfunding platform 140, for the determined monetary value (of step 210) to resolve the identified issue (of step 202) for the identified individual (of step 204). In various embodiments, event creation program 200 can create and publish a funding event generally on crowdfunding platform 140 or on a community-specific portion of crowdfunding platform 140 (e.g., a section that corresponds to individuals that live in a registered neighborhood). In an example embodiment, event creation program 200 creates the funding event for an estimated cost to resolve the issue (i.e., from step 210). In another example embodiment, event creation program 200 creates the funding event for a cost that corresponds to information provided by a specific service provider (e.g., a set price for charitable assistance, an estimated repair cost, etc.).

In one embodiment, event creation program 200 creates the funding event and publishes the funding event on crowdfunding platform 140 in response to receiving authorization from an administrator user. In another embodiment, event creation program 200 automatically creates the funding event on crowdfunding platform 140 in response to determining that the individual meets eligibility criteria and determining a monetary value to resolve the identified issue. In an example scenario, event creation program 200 notifies the user that submitted the request for a crowdfunding event that event creation program 200 has created the crowdfunding event.

In step 214, event creation program 200 provides notifications to registered users. In one embodiment, event creation program 200 provides a notification regarding the created funding event (of step 212) to one or more registered users of crowdfunding platform 140. Event creation program 200 can provide notifications in a variety of forms and communication methods, such as email notifications, push notifications to mobile devices, notifications within a crowdfunding application (e.g., application 114), a posting to a public website, or any other combination of notification formats, in accordance with embodiments of the present invention. Various embodiments of the present invention operate to match a funding event to interested users of crowdfunding platform 140 (e.g., utilizing registered user data 144). In example embodiments, event creation program 200 identifies one or more users of crowdfunding platform 140 that are associated with a user preference (e.g., in registered user data 144) indicating interest in donating to funding events with a characteristic (e.g., issue type, issue/individual location, etc.) that matches a characteristic of the created funding event (from step 212).

In one scenario, event creation program 200 sends a general notification to registered users of crowdfunding platform 140 (e.g., an email notification that includes a plurality of new funding events). In another scenario, event creation program 200 provides notifications to registered users based on user preference data indicated in registered user data 144. For example, event creation program 200 determines that a created funding event includes an issue associated with a particular category (e.g., repair type, weather-related event, location, etc.). In this example, event creation program 200 sends email notifications regarding the funding event to registered users of crowdfunding platform 140 that have indicated (in registered user data 144) to receive notification for funding events in the particular issue category.

In yet another scenario, event creation program 200 sends notifications to registered users of crowdfunding platform 140 that are associated with the same community as the issue of a funding event. For example, event creation program 200 determines that a created funding event includes an issue that is located within neighborhood. In this example, event creation program 200 sends mobile device push notifications regarding the funding event to registered users of crowdfunding platform 140 that are associated with the neighborhood (e.g., utilizing registered user data 144).

Figure 3:
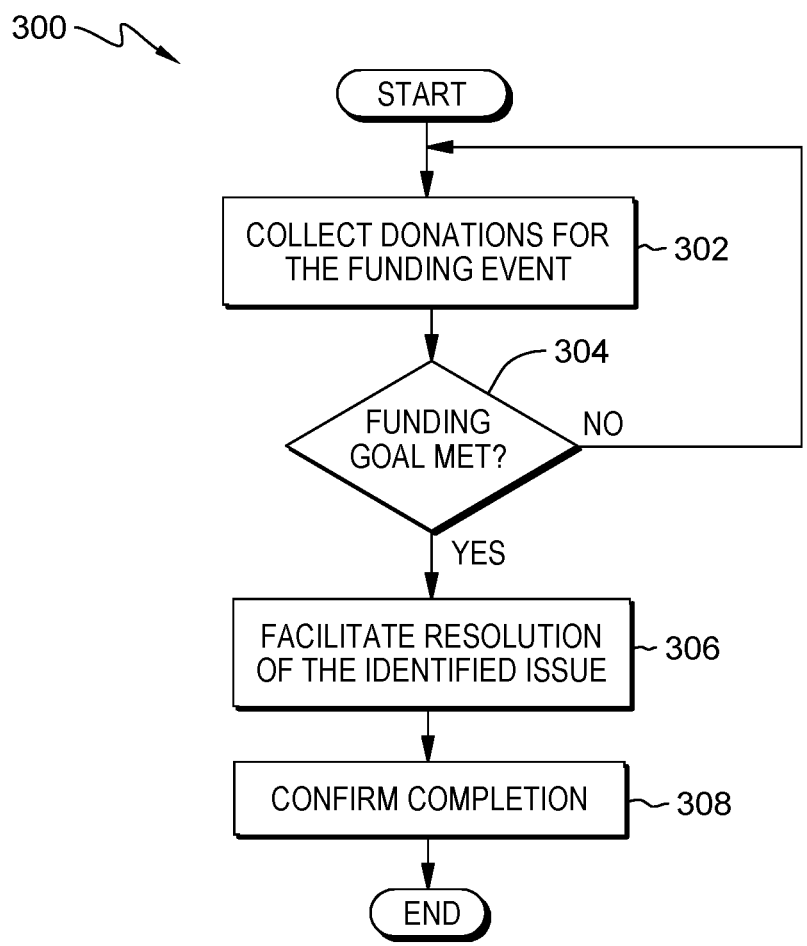
FIG. 3 is a flowchart depicting operational steps of a program for managing a funding event, in accordance with an embodiment of the present invention.

In various embodiments of the present invention, event creation program 200 provides a notification to registered users of crowdfunding platform 140 to facilitate a secure and direct channel to send and receive donations (as discussed in further detail with regard to FIG. 3). In an example embodiment, event creation program 200 communicates a notification to a crowdfunding application of a user of crowdfunding platform 140 (e.g., application 134 of client device 130). In this embodiment, the user has indicated (e.g., in registered user data 144) that the user authorizes an automatic contribution of fifty dollars for issues in a community that the user is a member (i.e., a pre-authorized automatic contribution). Accordingly, in response to receiving a notification of a funding event in the community, the crowdfunding application provides a donation in the amount of the automatic contribution (described in further detail with regard to FIG. 3).

FIG. 3 is a flowchart depicting event management program 300, a program for managing a funding event by collecting donations to the funding event and facilitating a resolution, in accordance with embodiments of the present invention. In one embodiment, crowdfunding platform 140 utilizes event management program 300 to manage active funding events. In another embodiment, event management program 300 can communicate with client-side crowdfunding applications of registered users (e.g., application 134) to securely collect donations. In one scenario, event management program 300 runs as a background process on crowdfunding platform 140. In another scenario, event management program 300 initiates in response to event creation program 200 creating a funding event (in step 212).

In step 302, event management program 300 collects donations for the funding event. In one embodiment, event management program 300 collects donations from users of crowdfunding platform 140 for the funding event (e.g., created in step 212 of event creation program 200). Event management program 300 provides a secure communication channel for users of crowdfunding platform 140 to directly provide donations. In various embodiments, event management program 300 can collect donations through a combination of donations submitted by general users of crowdfunding platform 140 and donations submitted by users that are associated with funding event (e.g., received notifications in step 214 of event creation program 200). Event management program 300 collects donations to the funding event and tracks the funding event donations in relation to the funding goal corresponding to the funding event. In additional embodiments, event management program 300 can actively identify additional users (i.e., have not previously received a notification of a particular funding event) and send a donation request notification to the additional users.

In an example scenario, a user of crowdfunding platform 140 (e.g., an individual utilizing client device 130) has configured the user's profile (in registered user data 144) to provide an automatic contribution of a maximum of fifty dollars for funding events for issues in the user's neighborhood (i.e., a pre-authorized automatic contribution preference configuration). In this example scenario, the user receives a notification regarding the funding event (in step 214 of event creation program 200) and an account of the user automatically provides the fifty-dollar donation to the funding event, which is collected by event management program 300. Event management program 300 can collect automatic contributions from a plurality of users to achieve the funding goal (e.g., respective maximum contributions or an even distribution of contributions less than the configured maximum preference of a user).

In another aspect of this scenario, event management program 300 determines that, after all automatic contributions corresponding to a funding event have been collected, the contribution amount is less than the funding goal. In this aspect, event management program 300 can send an additional notification to one or more users that have provided an automatic contribution to request authorization of an increased contribution amount. In this example, an individual utilizing client device 130 responds by providing input that authorizes a (one-time) contribution amount increase from fifty dollars to one-hundred dollars.

In decision step 304, event management program 300 determines whether the funding goal is met. In one embodiment, event management program 300 determines whether the collected donations (from step 302) meet the monetary goal of the funding event. In an example embodiment, event management program 300 performs the process of decision step 304 concurrently with the donation collection of step 302. In one example, event management program 300 receives automatic contributions that meet the monetary goal of the funding event. Accordingly, event management program 300 determines that the funding goal is met.

Alternatively, event management program 300 can determine that received contributions (automatic and otherwise) do not meet the monetary goal of a funding event. In such scenarios (decision step 304, NO branch), event management program 300 continues to collect donations for the funding event (step 302).

In various embodiments, event management program 300 can determine whether the entire funding goal is met, or whether a defined amount of the funding goal is met (e.g., a percentage of the total, a specific dollar amount etc. For example, an individual utilizing client device 120 is the recipient of the funding event and provides input defining that the individual can finance the last three-hundred dollars of the funding event if needed. In this example, event management program 300 can factor in the three-hundred-dollar contribution from the recipient user when determining whether the funding goal is met (in decision step 304).

In another embodiment, event management program 300, in response to determining that the funding goal is met, provides notifications to users of crowdfunding platform 140 that are associated with the funding event. For example, event management program 300 provides a notification to users including: one or more recipient users of the funding event (e.g., users of client device 120), one or more donor users (e.g., user of client device 130), a user that submitted a request for creation of the funding event (e.g., a user of client device 110), and a service provider associated with the funding event (e.g., a window repair service assigned to perform the repair).

In step 306, event management program 300 facilitates resolution of the identified issue. More specifically, in response to determining that the funding goal is met (decision step 304, YES branch), event management program 300 facilitates resolution of the identified issue of the funding event. In an example embodiment, the funding event includes information (e.g., stored metadata in storage device 142) that includes details of the funding event, such as a selected service provider, a plurality of service providers to select from, indication of one or more recipient users, information associated with the one or more recipient users, available recipient user preferences, etc. In an example, event management program 300 allows the recipient user (e.g., individual utilizing client device 120) to select a service provider from a plurality of available service providers (e.g., provide input selecting a window repair service). In another example, the funding event includes an indication of a specific service provider that event management program 300 utilizes to facilitate resolution of the identified issue.

In an additional embodiment, event management program 300 authorizes payment to the service provider. For example, event management program 300 releases the funds collected in the funding event directly to the selected service provider (e.g., to a meal assistance service) to facilitate resolution of the identified issue. In this example, event management program 300 can authorize payment to the meal assistance service and provide the meal assistance service the contact information for the one or more recipient users (i.e., to facilitate resolution of the issue in the funding event).

In another scenario, event management program 300 authorizes payment to the selected service provider with a hold, indicating the payment will be released in response to receiving authorization that the service has been performed successfully (e.g., a window repair service). Accordingly, event management program 300 can release the funds (i.e., authorize payment) to the service provider in response to receiving confirmation (e.g., proof of completion) from the service provider and the recipient user.

Event management program 300 can establish a secure communication channel between a recipient user and a service provider. For example, event management program 300 establishes a secure communication channel, over network 105, between the recipient user, utilizing client device 120, and a window repair service (not shown). In this example, the recipient user utilizes the secure communication channel to schedule a repair service with the service provider to repair the broken widow and provide additional information, such as location information (i.e., to resolve the issue of the funding event).

In step 308, event management program 300 confirms completion. In one embodiment, event management program 300 verifies that the issue has been resolved (e.g., via step 306), and accordingly, event management program 300 closes-out the funding event (e.g., created in step 212 of event creation program 200) as being completed. In another embodiment, event management program 300 provides notifications to relevant users of crowdfunding platform 140 that the issue of the funding event has been resolved and the funding event is complete. The notifications to relevant users can include: notifications to donor users that the donations have been successfully utilized to resolve the corresponding issue, notifications to one or more recipient users that the issue is resolved and the funding event has been closed-out, a notification to a user that submitted the request for the funding event (i.e., the initiating user), etc.

Embodiments of the present invention provide a plurality of advantages through automatic generation of a funding event in response to identifying an issue. Various embodiments of the present invention recognize that an automated system to discover an issue (e.g., leveraging image analytics), and then subsequently resolve the issue via an automatically created funding event, is not currently available. Additional embodiments of the invention provide further advantages by automatically collecting donations to a funding event and facilitating a resolution to an issue with minimal, or no, user intervention.

Figure 4:
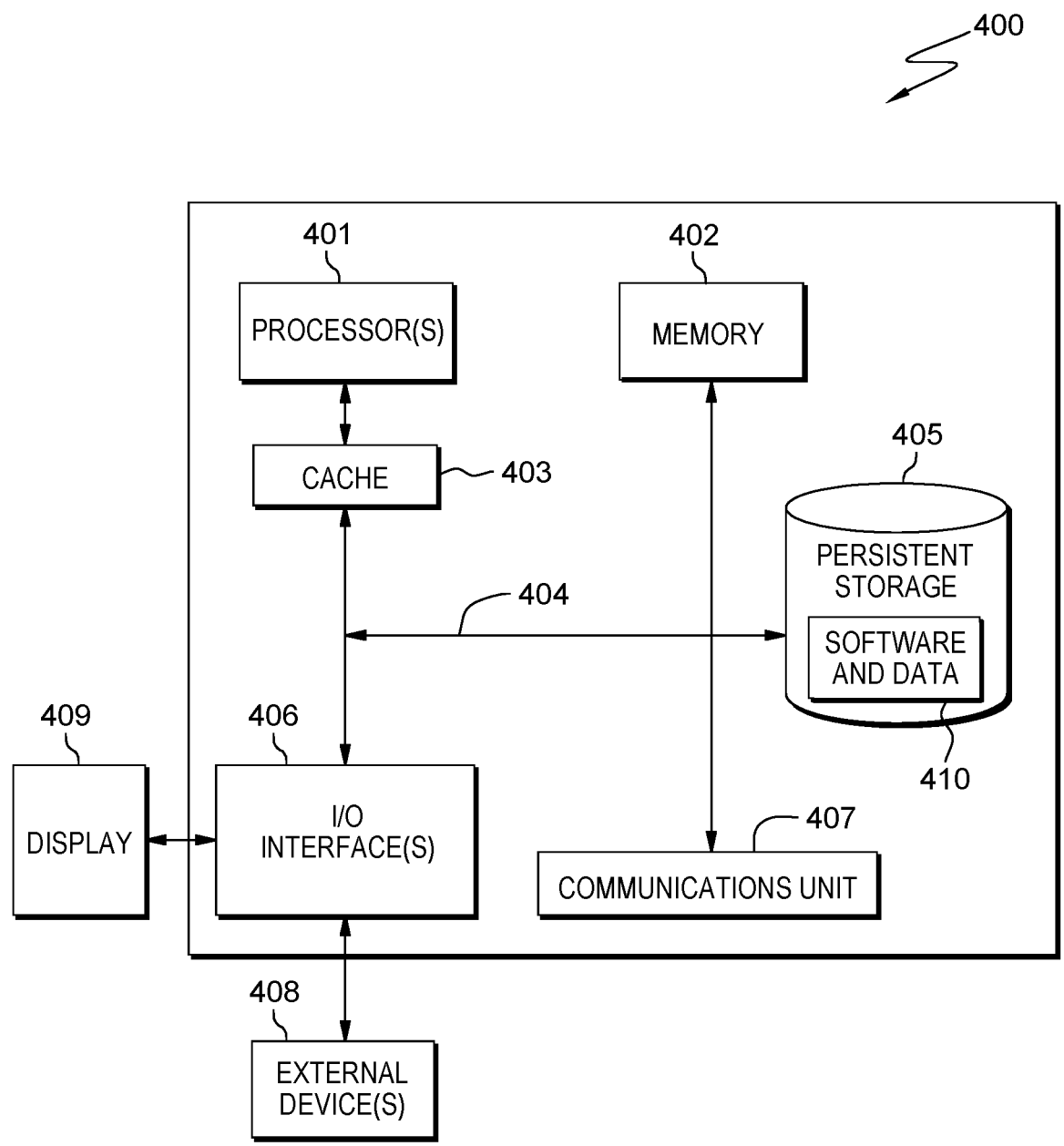
FIG. 4 depicts a block diagram of components of a computing system representative of the client devices and crowdfunding platform of FIG. 1, in accordance with an embodiment of the present invention.

FIG. 4 depicts computer system 400, which is representative of client device 110, client device 120, client device 130, and crowdfunding platform 140, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made. Computer system 400 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data 410) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 410 can be stored in persistent storage 405 for access and/or execution by one or more of the respective processor(s) 401 via cache 403. With respect to client device 110, client device 120, and client device 130, software and data 410 includes respective instances of user interface 112, user interface 122, user interface 132, application, 114, application 124, and application 134. With respect to crowdfunding platform 140, software and data 410 includes event creation program 200, event management program 300, registered user data 144, and service data 146.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., software and data 410) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., software and data 410) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for automatically generating a funding event on a crowdfunding platform, comprising:
   identifying, by one or more processors, an issue and an individual associated with the issue, based, at least in part, on registered user data associated with users of the crowdfunding platform, wherein identifying an issue comprises;
   analyzing, by the one or more processors, requests for funding submitted to the crowdfunding platform;
   analyzing, by the one or more processors, data streams utilizing one or more actions selected from the group consisting of:
      analyzing images provided to the crowdfunding platform;
      analyzing social media posts and data;
   determining, by the one or more processors, that an eligibility score of the individual associated with the issue exceeds a predetermined threshold required to permit creation of the funding event on the crowdfunding platform; and
   responsive to determining that the eligibility score of the identified individual associated with the issue exceeds the predetermined threshold required to permit creation of the funding event on the crowdfunding platform, automatically generating, by the one or more processors, the funding event on the crowdfunding platform for receiving donations to resolve the identified issue.

2. The method of claim 1, wherein automatically generating the funding event for receiving donations to resolve the identified issue further comprises:
   determining, by the one or more processors, a monetary value that corresponds to resolving the identified issue based on one or more actions selected from the group consisting of:
      identifying, by the one or more processors, a historical average cost to resolve issues that are similar to the identified issue;
      soliciting, by the one or more processors, cost estimates from one or more service providers; and
      identifying, by the one or more processors, pricing estimates on publicly available websites, and
   wherein the created funding event includes a goal corresponding to the determined monetary value.

3. The method of claim 1, further comprising:
   identifying, by the one or more processors, one or more users of the crowdfunding platform that are associated with a user preference indicating interest in donating to funding events with a characteristic that matches a characteristic of the created funding event; and
   providing, by the one or more processors, notifications of the created funding event to the identified one or more users of the crowdfunding platform.

4. The method of claim 1, wherein identifying the issue and the individual associated with the issue further comprises:
   determining, by one or more processors, that the issue satisfies event rules of the crowdfunding platform.

5. The method of claim 1, further comprising:
collecting, by the one or more processors, donations to the funding event, wherein the collected donations include pre-authorized automated contributions from at least one user, as defined in user preference information associated with the at least one user.

6. The method of claim 1, further comprising:
in response to determining that a funding goal of the funding event is met, scheduling, by the one or more processors, a resolution to the identified issue with a corresponding service provider.

7. The method of claim 1, further comprising determining the eligibility score of the identified individual associated with the issue based, at least in part, on:
data included in a request for the funding event, historical usage of the crowdfunding platform by the individual associated with the issue, social media information provided by the individual associated with the issue, registration information provided by the individual associated with the issue, and publicly available data, wherein the eligibility score is a function of a number of predefined eligibility rules that the identified individual associated with the issue satisfies.

8. The method of claim 6, further comprising:
establishing, by the one or more processors, a secure communication channel between the identified individual associated with the issue and the service provider.

9. A computer program product for automatically generating a funding event on a crowdfunding platform, comprising:
one or more computer readable storage media and program instructions stored on the one or more computer readable storage media, the program instructions comprising:
program instructions to identify an issue and an individual associated with the issue, based, at least in part, on registered user data associated with users of the crowdfunding platform, wherein the instructions to identify an issue comprises instructions to:
analyze requests for funding submitted to the crowdfunding platform;
analyzing data streams utilizing one or more actions selected from the group consisting of:
analyze images provided to the crowdfunding platform;
analyze social media posts and data;
program instructions to determine that an eligibility score of the individual associated with the issue exceeds a predetermined threshold required to permit creation of the funding event on the crowdfunding platform; and
in response to determining that the eligibility score of the identified individual associated with the issue exceeds the predetermined threshold required to permit creation of the funding event on the crowdfunding platform, program instructions to generate the funding event on the crowdfunding platform for receiving donations to resolve the identified issue.

10. The computer program product of claim 9, wherein the program instructions to automatically generate the funding event for receiving donations to resolve the identified issue further comprise program instructions to:
determine a monetary value that corresponds to resolving the identified issue based on one or more actions selected from the group consisting of:
identifying, by one or more processors, a historical average cost to resolve issues that are similar to the identified issue;
soliciting, by the one or more processors, cost estimates from one or more service providers; and
identifying, by the one or more processors, pricing estimates on publicly available websites, and
wherein the created funding event includes a goal corresponding to the determined monetary value.

11. The computer program product of claim 9, further comprising program instructions, stored on the one or more computer readable storage media, to:
identify one or more users of the crowdfunding platform that are associated with a user preference indicating interest in donating to funding events with a characteristic that matches a characteristic of the created funding event; and
provide notifications of the created funding event to the identified one or more users of the crowdfunding platform.

12. The computer program product of claim 9, wherein the program instructions to identify the issue and the individual associated with the issue further comprise program instructions to:
determine that the issue satisfies event rules of the crowdfunding platform.

13. The computer program product of claim 9, further comprising program instructions, stored on the one or more computer readable storage media, to:
collect donations to the funding event, wherein the collected donations include pre-authorized automated contributions from at least one user, as defined in user preference information associated with the at least one user.

14. The computer program product of claim 9, further comprising program instructions, stored on the one or more computer readable storage media, to:
in response to determining that a funding goal of the funding event is met, schedule a resolution to the identified issue with a corresponding service provider.

15. A computer system comprising:
one or more computer processors;
one or more computer readable storage media; and
program instructions stored on the computer readable storage media for execution by at least one of the one or more processors, the program instructions comprising:
program instructions to identify an issue and an individual associated with the issue, based, at least in part, on registered user data associated with users of the crowdfunding platform, wherein the instructions to identify an issue comprises instructions to:
analyze requests for funding submitted to the crowdfunding platform;
analyzing data streams utilizing one or more actions selected from the group consisting of:
analyze images provided to the crowdfunding platform;
analyze social media posts and data;
program instructions to determine that an eligibility score of the individual associated with the issue exceeds a predetermined threshold required to permit creation of the funding event on the crowdfunding platform; and
responsive to determining that the eligibility score of the identified individual associated with the issue exceeds the predetermined threshold required to permit creation of the funding event on the crowdfunding platform, program instructions to create the funding event on the crowdfunding platform for receiving donations to resolve the identified issue.

16. The computer system of claim 15, wherein the program instructions to automatically generate the funding event for receiving donations to resolve the identified issue further comprise program instructions to:
  determine a monetary value that corresponds to resolving the identified issue based on one or more actions selected from the group consisting of:
    identifying, by one or more processors, a historical average cost to resolve issues that are similar to the identified issue;
    soliciting, by one or more processors, cost estimates from one or more service providers; and
    identifying, by one or more processors, pricing estimates on publicly available websites, and
  wherein the created funding event includes a goal corresponding to the determined monetary value.

17. The computer system of claim 15, further comprising program instructions, stored on the computer readable storage media for execution by at least one of the one or more processors, to:
  identify one or more users of the crowdfunding platform that are associated with a user preference indicating interest in donating to funding events with a characteristic that matches a characteristic of the created funding event; and
  provide notifications of the created funding event to the identified one or more users of the crowdfunding platform.

18. The computer system of claim 15, wherein the program instructions to identify the issue and the individual associated with the issue further comprise program instructions to:
  determine that the issue satisfies event rules of the crowdfunding platform.

19. The computer system of claim 15, further comprising program instructions, stored on the computer readable storage media for execution by at least one of the one or more processors, to:
  collect donations to the funding event, wherein the collected donations include pre-authorized automated contributions from at least one user, as defined in user preference information associated with the at least one user.

20. The computer system of claim 15, further comprising program instructions, stored on the computer readable storage media for execution by at least one of the one or more processors, to:
  in response to determining that a funding goal of the funding event is met, schedule a resolution to the identified issue with a corresponding service provider.

* * * * *